(12) United States Patent
Lee et al.

(10) Patent No.: US 6,476,311 B1
(45) Date of Patent: Nov. 5, 2002

(54) PORTABLE MULTIPLE POWER SUPPLY COMPRISING SOLAR CELL

(76) Inventors: Soo-Keun Lee, #308-703 Hanshin Apt., 60-3 Chamson-Dong, Socho-Ku, 137-030, Seoul (KR); Kyung-Sook Jung, #101-803 Hanbit Apt., 99 Oun-Dong, Yusong-Ku, 305-333 Taejon (KR)

( * ) Notice: Subject to any disclaimer, the term of this patent is extended or adjusted under 35 U.S.C. 154(b) by 0 days.

(21) Appl. No.: 09/786,339
(22) PCT Filed: Sep. 9, 1999
(86) PCT No.: PCT/KR99/00533
§ 371 (c)(1),
(2), (4) Date: May 17, 2001
(87) PCT Pub. No.: WO00/14849
PCT Pub. Date: Mar. 16, 2000

(30) Foreign Application Priority Data

Sep. 9, 1998 (KR) ............................................. 98-37095

(51) Int. Cl.⁷ ............................. H02J 7/35; H01L 31/04
(52) U.S. Cl. ...................... 136/244; 136/251; 136/291; 136/293; 323/906; 323/221; 320/101; 320/163
(58) Field of Search ................................. 136/244, 151, 136/291, 293; 323/906, 221; 320/101, 163

(56) References Cited

U.S. PATENT DOCUMENTS

| | | | |
|---|---|---|---|
| 5,500,052 A | | 3/1996 | Horiuchi et al. ............. 136/244 |
| 5,522,943 A | * | 6/1996 | Spencer et al. ............. 136/245 |
| 5,714,869 A | | 2/1998 | Tamechika et al. ......... 320/101 |
| 6,350,944 B1 | * | 2/2002 | Sherif et al. ................. 136/244 |

FOREIGN PATENT DOCUMENTS

| | | | |
|---|---|---|---|
| JP | 64-54741 | | 4/1989 |
| JP | 2-308574 A | * | 12/1990 |
| JP | 5-83880 | | 4/1993 |
| JP | 5-207675 | | 8/1993 |
| JP | 5-343725 A | * | 12/1993 |
| JP | 6-5345 | | 1/1994 |
| JP | 6-296333 | | 10/1994 |

OTHER PUBLICATIONS

English Language abstracts of JP–6–5345, Jan. 1994.
English Language abstract of JP–64–54741, Apr. 1989.
English Language abstract of JP–5–83880, Apr. 1993.
English Language abstract of JP–5–207675, Aug. 1993.
English Language abstract of JP–6–296333, Oct. 1994.

* cited by examiner

Primary Examiner—Alan Diamond
(74) Attorney, Agent, or Firm—Greenblum & Bernstein, P.L.C.

(57) ABSTRACT

The present invention relates to a type of portable emergency power supply for use when storage batteries of mobile appliances such as cellular telephones, radios, camcorders, laptops and mini cassette players are discharged or become unusable. In particular, by utilizing solar cells, the present invention can supply power to mobile phones, laptops and mini cassette players and other devices during the daytime when the sun shines. The present invention provides a portable multi-voltage power source device that is capable of generating various levels of power voltages for diverse appliances requiring different electric voltages. The present invention includes at least one solar cell plate formed of a plurality of solar cells connected to each other and a power source selection unit to select one of a plurality of voltages by coupling the positive and negative poles of the connected solar cells in selected fashions. A portable case holds the solar cell plates, the power source selection unit and a power connection portion therein.

10 Claims, 12 Drawing Sheets

PORTABLE MULTIPLE POWER SUPPLY COMPRISING SOLAR CELL

DESCRIPTION TECHNICAL FIELD

The present invention relates to a portable emergency power source to use when storage batteries of mobile appliances, such as, cellular phones, laptops and mini cassette players, are discharged or become unusable; and more particularly to a multi-voltage power source utilizing solar cells to generate a various level of power voltages for diverse appliances with different required electric voltages.

BACKGROUND ART

As electronic technology develops, portable personal appliances like cellular phones, laptops and mini cassette players are commonly used and people frequently fall into a situation where batteries of their devices are discharged, and fail to obtain power at a time of necessity. This power supply problem has called for a new storage battery that lasts long and also one that satisfy the tendency of minimization of devices. So, solutions to both conditions have been suggested.

Meanwhile, Motorola U.S.A. has attempted to provide emergency power to mobile phone batteries by using a solar cell plate attached at the back of a storage battery of a mobile phone, which eventually failed commercially due to fragility of solar cells that have to be directly attached on batteries and become easily damaged.

DISCLOSURE OF INVENTION

It is, therefore, an object of the present invention to provide a multi-voltage power source device utilizing solar cells, which are free from deformation and damages.

It is another object of the present invention to provide a multi-voltage power source device utilizing solar cells, which can be carried out separately from an appliance in use and then connected to it again easily.

It is further anther object of the present invention to provide a multi-voltage power source device utilizing solar cells producing a various level of power voltages with just simple handling, thereby applying it to mobile appliances whose required voltages are different from each other.

In accordance with one aspect of the present invention, there is provided a portable multi-voltage power source device, for selectively generating various levels of power sources comprising: at least one solar cell plates for molding a plurality of unit modules, each of the unit modules including a first electrode, a second electrode and a number of solar cells which are connected to each other in series; a power selection unit for outputting various levels of power sources by connecting a first and a second electrodes of one unit module to a first and a second electrodes of another unit module in parallel or in series and combinations thereof; and a portable case for incorporating the solar cell plates and the power selection unit therein.

BEST MODE FOR CARRYING OUT THE INVENTION

Figure 1:
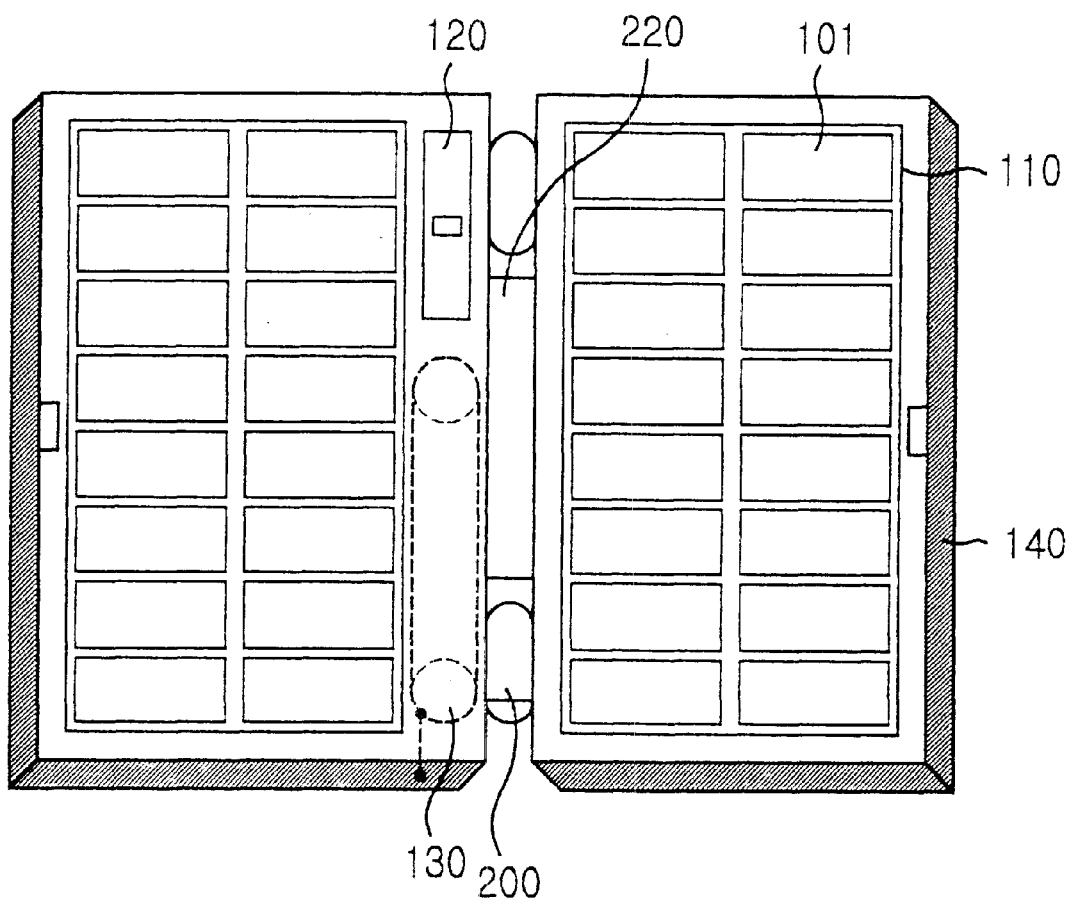
FIG. 1 roughly shows a portable multi-voltage power source device of an embodiment of the present invention.

FIG. 1 shows a structure of a portable multi-voltage power source device in accordance with a preferred embodiment. According to the embodiment, the device is made up foldable just like a wallet or an electronic scheduler, which can be carried out separately from portable appliances, then connected and used at one's need and convenience.

Referring to FIG. 1, the present invention comprises at least one solar cell plate 110, a power source selection unit 120 to select one or more among possible power voltages, a power connecting portion 130 for connecting power voltages selected from the selection unit 120 to mobile appliances and a portable case 140 incorporating thereinto the solar cell plates 110, the power source selection unit 120 and the power connecting portion 130 for carrying out.

Each of the solar cell plates 110 includes a plurality of solar cells 101 which are arranged in the form of matrix. The possible power voltages are obtained by coupling positive and negative terminals of the solar cells 101 in certain combinations.

Figure 2:
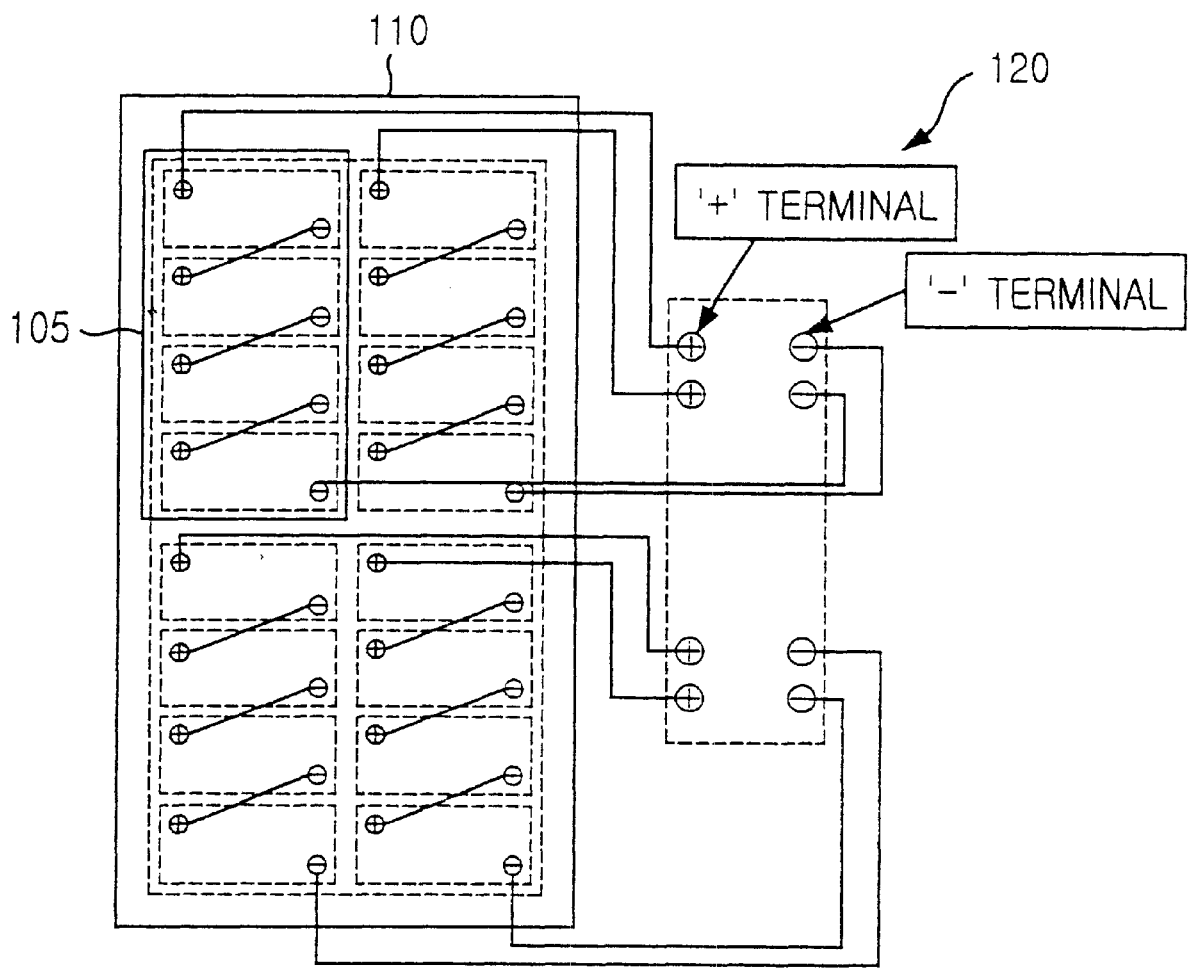
FIG. 2 shows the formation and the connection of a solar cell plate.
Figure 3A:
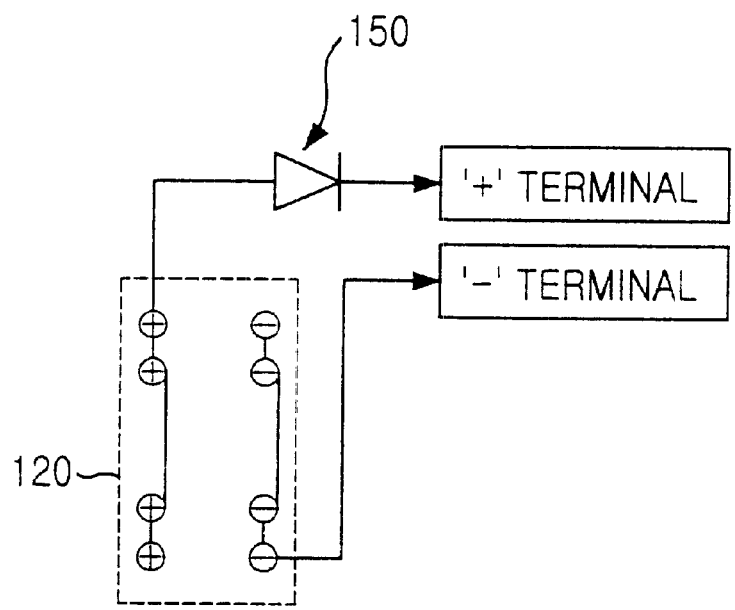
FIGS. 3 to 5 show how contact points of solar cell unit modules are connected in order to select various levels of power voltages.
Figure 3B:
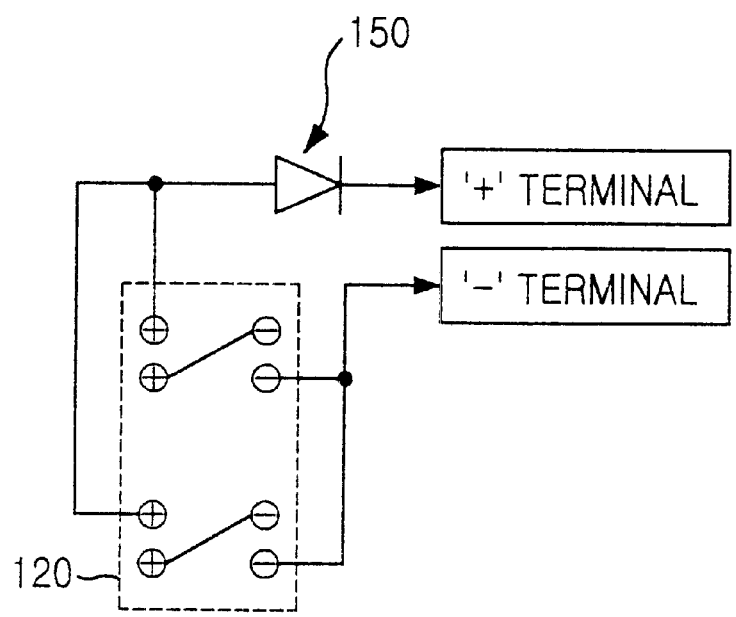
Figure 3C:
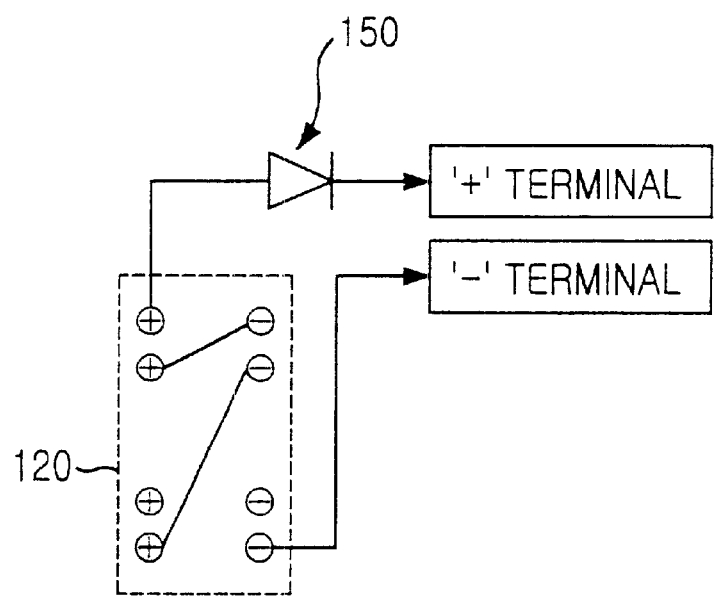
Figure 3D:
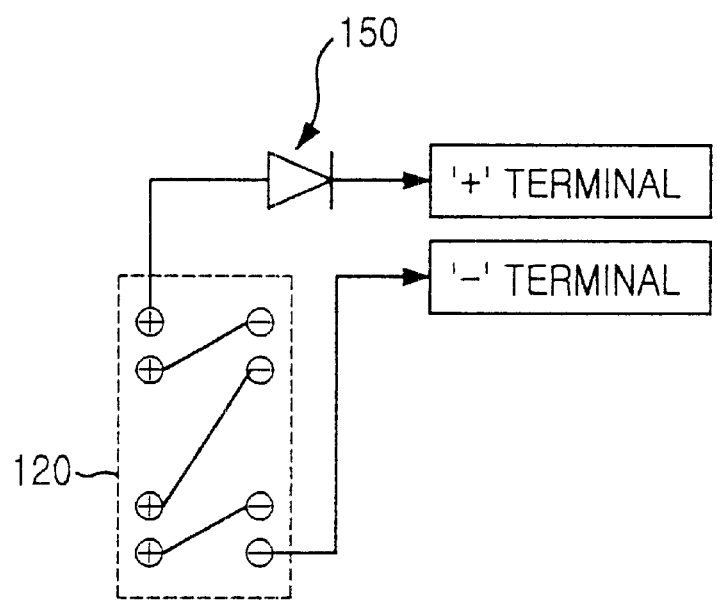

FIG. 2 is a constitution of a solar cell plate 110 of the present invention, which describes the polar connection of each cell. As shown in FIG. 2, the solar cell plate 110 consists of four unit modules 105, each of which 105 includes four solar cells 101 connected to each other in series. Both positive and negative poles of each unit module are connected to contact points of power source selection unit 120.

In the process of wiring on the array of solar cells 101 for easy portability and packaging or modeling, the present invention adopted transparent, heat-resistant polymers, which make it lighter, smaller and stronger to physical impacts from outside.

The solar cells 101, e.q., a semi-conductor element for generating a power source, directly convert sunlight energy into direct current electric power in daytime when the sunlight illuminates the solar cells 101. In case of a silicon solar cell, each solar cell generates approximately 0.5V of electromotive force, and the generated current increases in proportion to the sunlight, a solar cell size and the number of parallel connection. Thus, power voltage in need can be obtained by connecting cells in series and/or parallel, as shown in FIG. 2.

In a bid to embody both serial and parallel connections of solar cells on the cell plate 110 in versatile ways, the present invention installs power source selection unit 120 inside a portable case 140. An example of the embodiment and its principle will be described hereinafter.

Figure 4A:
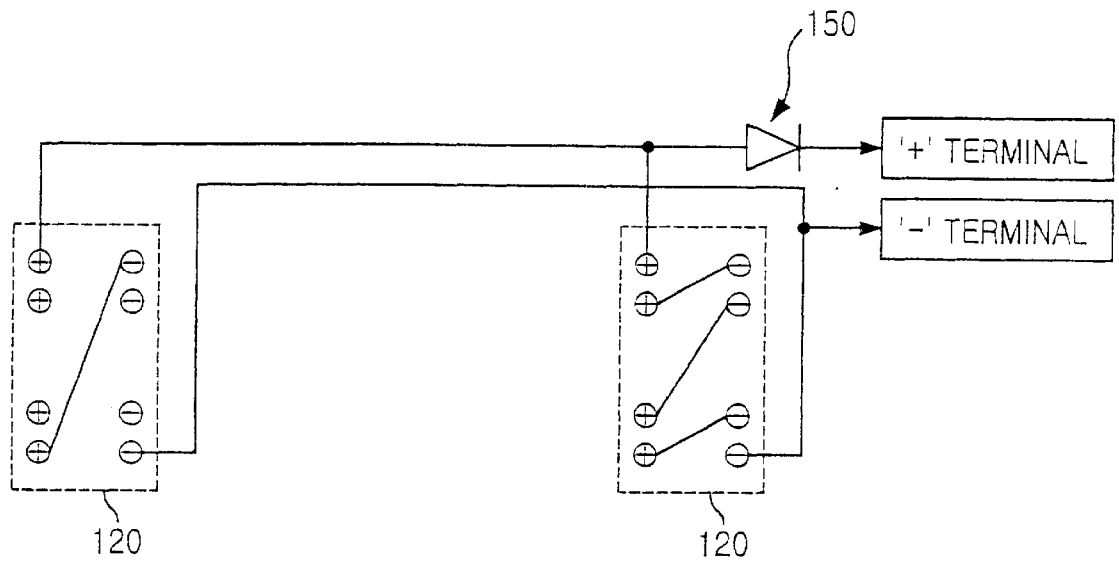
Figure 4B:
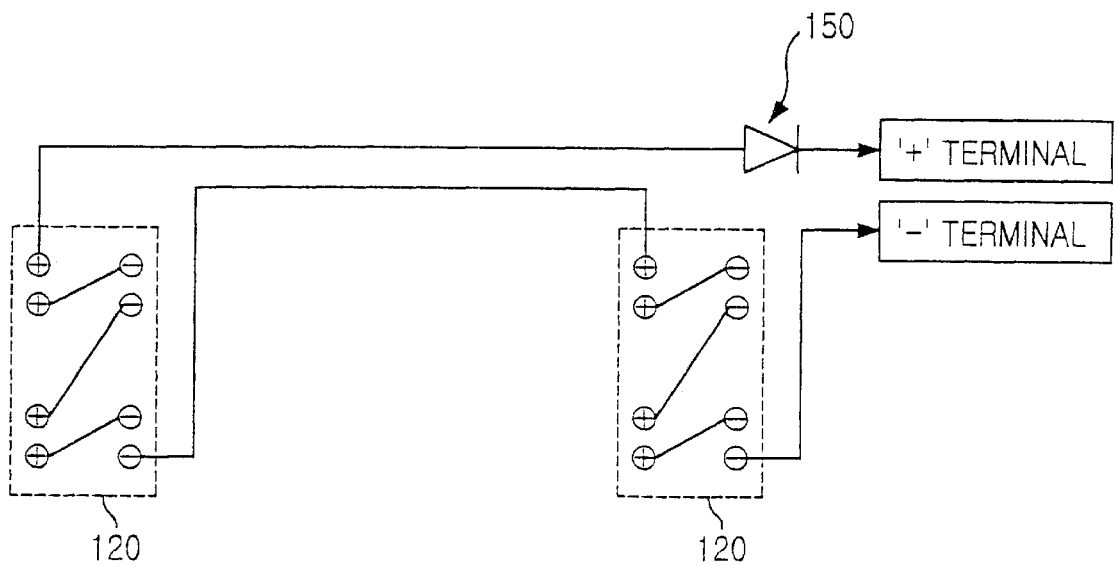
Figure 5A:
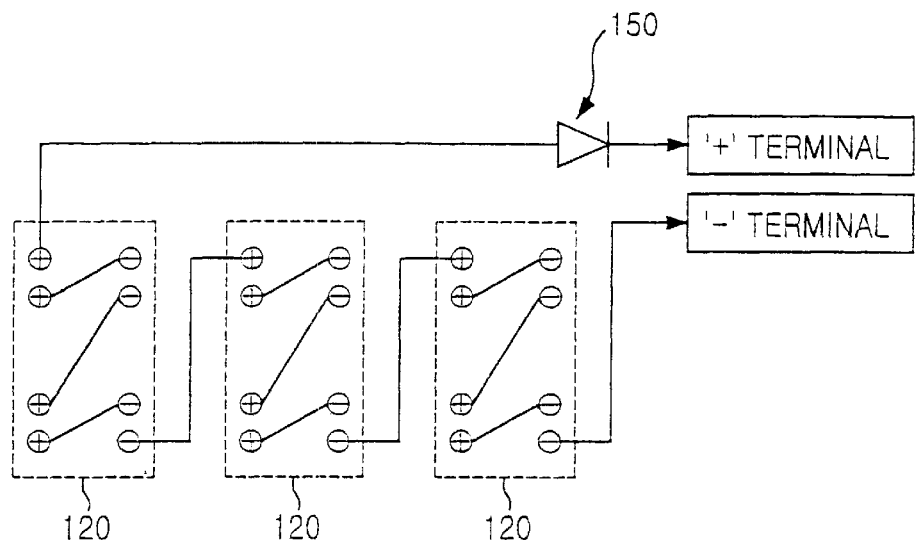
Figure 5B:
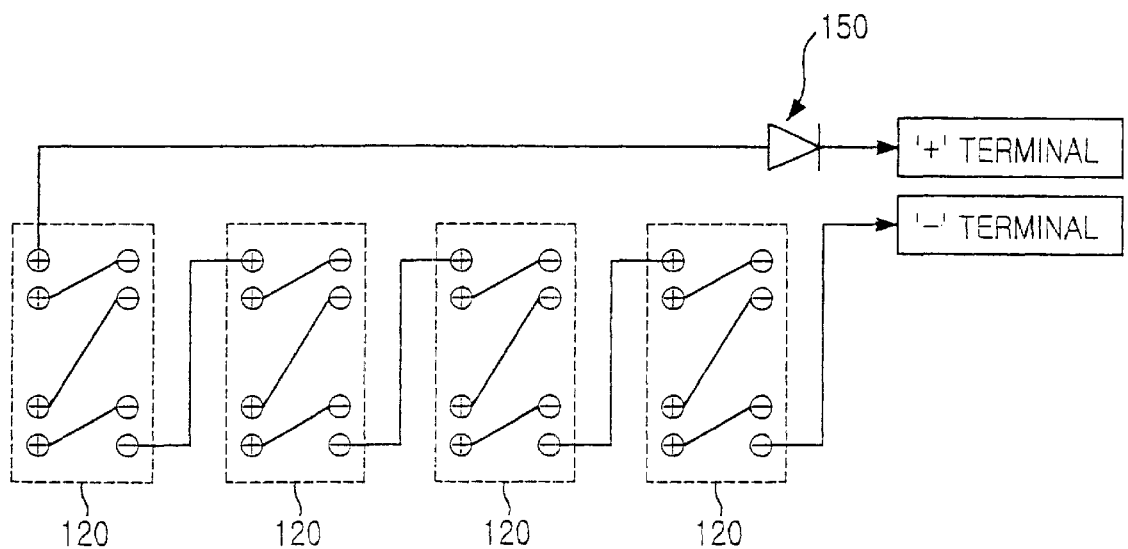

FIGS. 3 to 5 show how to make required power source of appliances in use at the power source selection unit 120.

In power source selection unit 120 are formed contact points corresponding to positive and negative poles of each unit module of a solar cell plate—which shown as ⊕ and ⊖ in the drawings. So, the power voltage in need can be obtained by properly connecting each contact point of power source selection unit 120, as shown in FIG. 3.

FIGS. 3A to 3D show wiring distributions to obtain operating voltages, e.q., 1.2~1.5V, 3.0~3.6V, 4.0~4.8V, 6.0~7.2V, respectively, from a solar cell plate 110. Let's suppose the required voltage of a mobile appliance is 6V. When we connect all of the four unit modules in series, the supplied charging voltage reaches 6.7~7.7V, which is adequate for the mobile appliance, even considering the voltage drop effect caused by a reverse current protection diode. In the same way, a voltage for mini cassette players is commonly 3V. A battery charging voltage of 3.4~3.8V can be obtained by connecting each two unit modules of a solar cell plate in series respectively and then combine the two unit sets in parallel. In case of devices using 1.5V, the required voltage can be obtained by connecting all unit modules of the cell plate in parallel.

FIGS. 4A, 4B, 5A and 5B show how to connect each contact point in case you need to get voltage higher than 6V, using more than two solar cell plates. After all, as shown in FIGS. 3 to 5, in accordance with an embodiment of the present invention, the structure of the power source-selection unit 120 allows users to freely select voltages that vary on the basis of 1.5V corresponding to each unit module.

Meanwhile, in case the voltage generated from solar cells 101 is not satisfactory, you can prevent the electric loss caused by flowing reverse current from a storage battery into solar cells 101, by making reverse current protection diode as shown in FIG. 3. One thing to have in mind is that voltage drops at the reverse current protection diode 150, because the diode 150 and solar cells 101 are connected in series. So you have to select a diode whose voltage drops less in order to minimize the loss. Also, to prevent overcharging a storage battery, you can add an extra circuit. Besides the preferred embodiment of the present invention where power sources vary at an interval of 1.5 volt, it is still possible to embody power sources varying at 2.0V intervals corresponding to increase the number of solar cells in series using lead acid batteries—that is, 2V, 4V, 6V, etc. And also, it is possible to apply to Ni-Cd battery and Lithium ion polymer batteries under 1.2V intervals corresponding to decrease the number of solar cells in series.

Figure 6A:
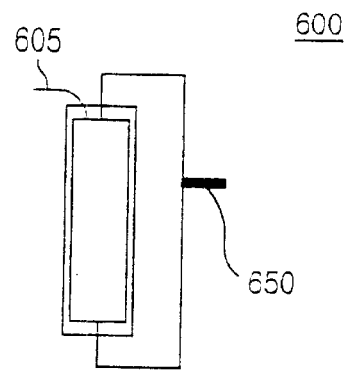
FIG. 6 shows an embodiment of operating switch to select power voltages.
Figure 6B:
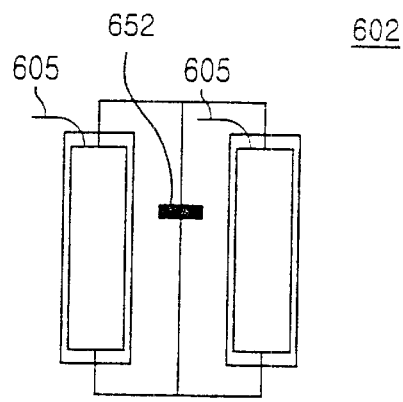
Figure 6C:
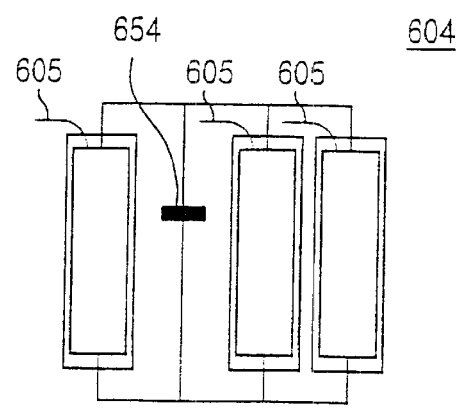
Figure 6D:
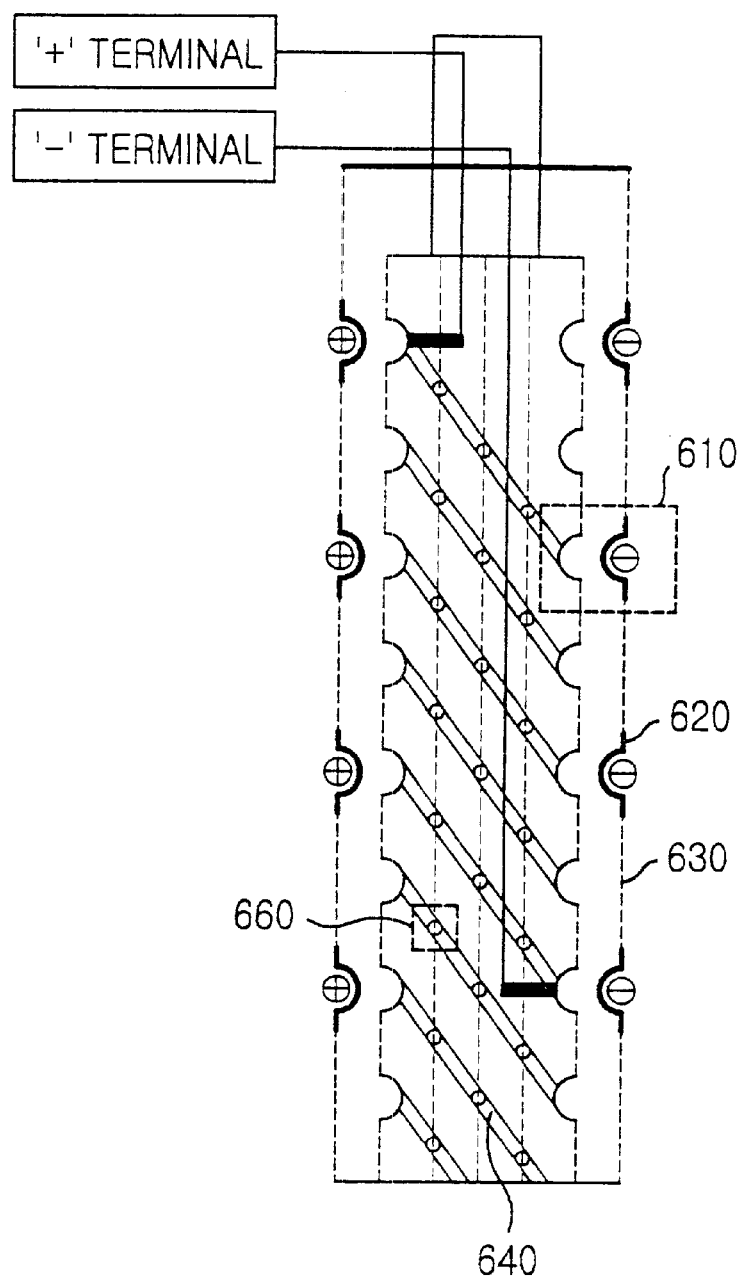

As shown in FIG. 6 which embodies contact points of power source selection unit 600, 602, 604 with simple handling, it's convenient to use ordinary contact point switch 650 as shown in FIG. 6A, in case you select two or three voltages. When you need to select voltage more than three, it's better off to use cylindrical revolving contact point switch 652 shown in FIG. 6B. Also, it's still possible to select various levels of power sources by corresponding the number of the revolving switches 654 to the proportion of increase or decrease of the solar cell plates 605.

Up until now is the description of an embodiment of a solar cell plate 110 and power source selection unit 120 to obtain a various level of power voltage thereafter.

In the meantime, in the process of supplying the obtained power voltage to appliances in use, electric wire needs to be kept comfortably inside a small portable case. For that, you can use a semi-automatic revolving reel. Having two contact points of ⊕ and ⊖ separated at the end of the wire, it's possible to connect various kinds of terminals apt for appliances just by assembling, thus realizing connections in line with terminals that vary to appliances.

Figure 7:
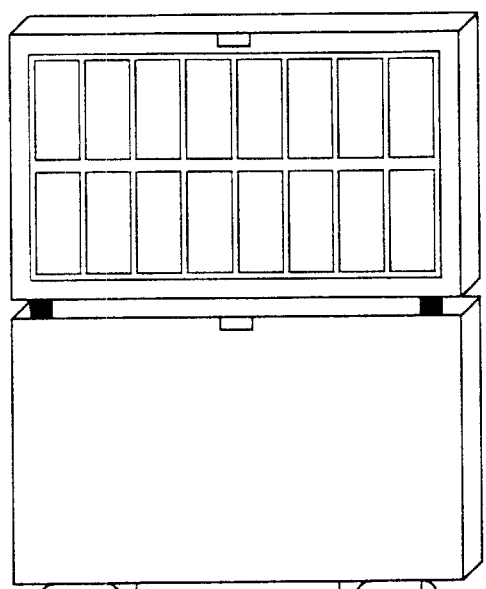
FIGS. 7 and 8 show various embodiments of a portable multi-voltage power source device.
Figure 7:
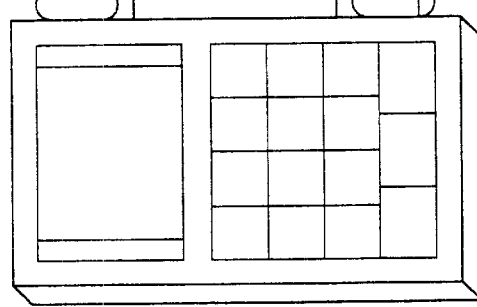
Figure 7:
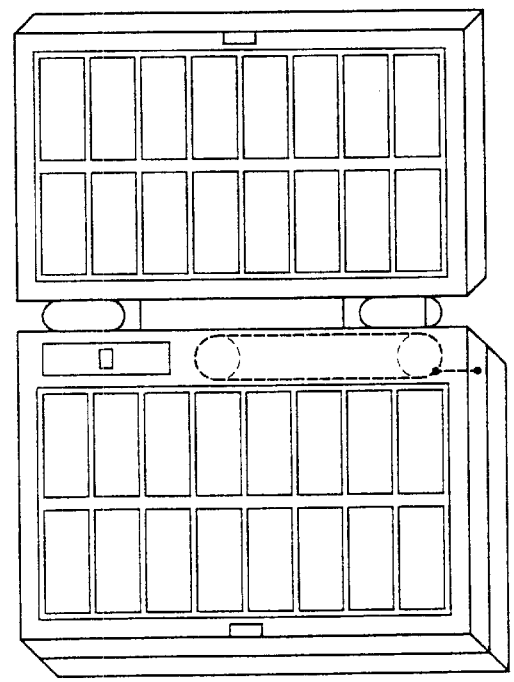
Figure 8A:
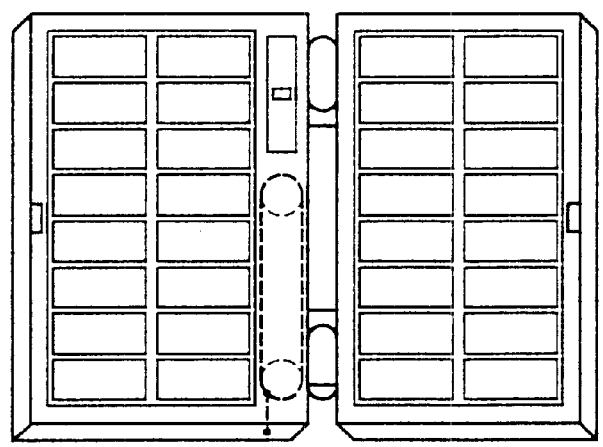
Figure 8B:
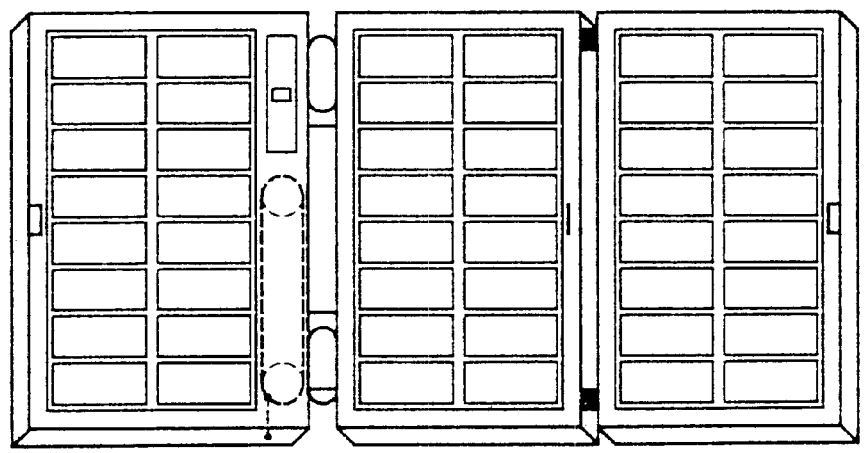
Figure 8C:
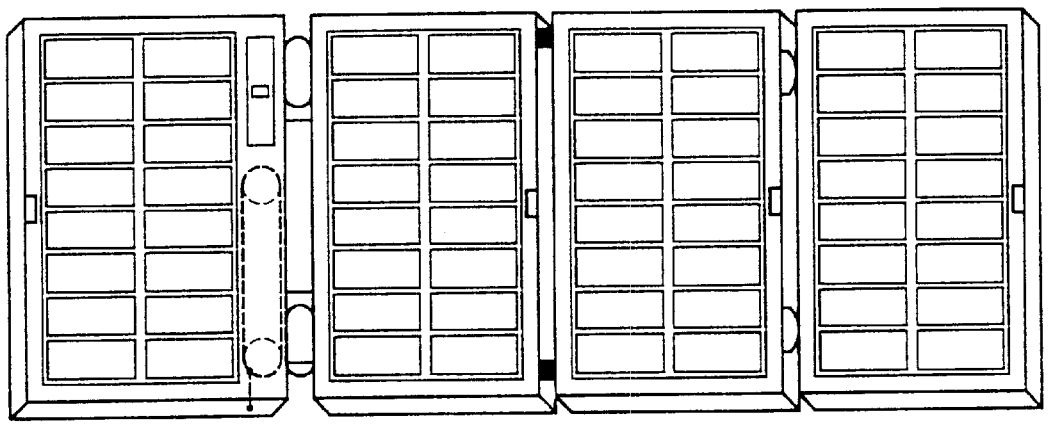
Figure 8D:
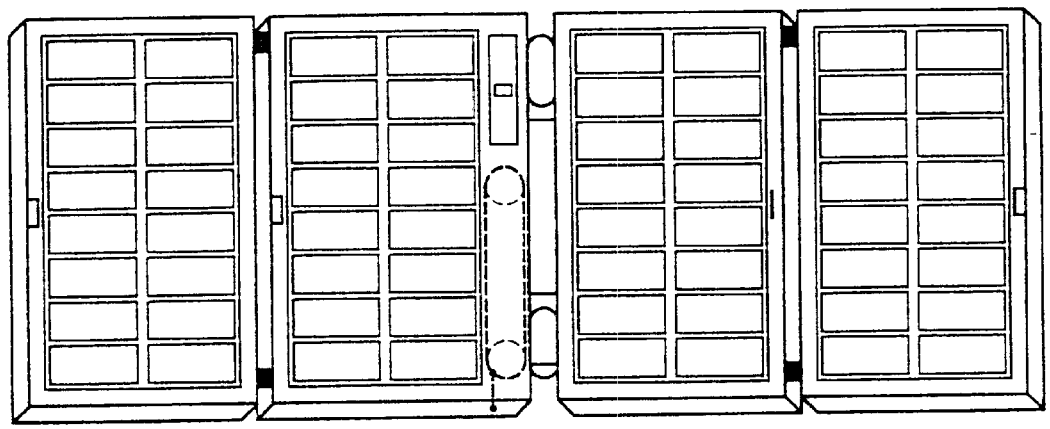

For easy portability, the present embodiment installs a solar cell plate, power source selection switch, or power source selection unit, and semi-automatic revolving reel, or power connecting portion, inside the portable case 140, which can be folded like an electronic scheduler. So, as illustrated in FIG. 1, the case with a solar cell plate built inside is made up to be folded with the help of hinges 200, and a terminal connection component 220 is kept in this folding part so that the terminal connection component 220 can be easily kept and carried out. Furthermore, as FIG. 7 shows, the multi-voltage power source device of the present invention can be formed in various shapes according to the uses, by equipping another case sheet with a solar cell plate to the electric scheduler or a calculator. Or you can make cases that are one-fold, one-fold and two-unfold, two-fold one-unfold, two-fold and one-unfold and so forth. Also possible are cases shaped like a wallet, a card and the like as well as one like an electronic scheduler above. Particularly, with minimized volume, card-shaped cases can be carried out in your wallet just like a credit card, and used by simply being attached to a hat, on a shoulder or a bag.

Figure 9:
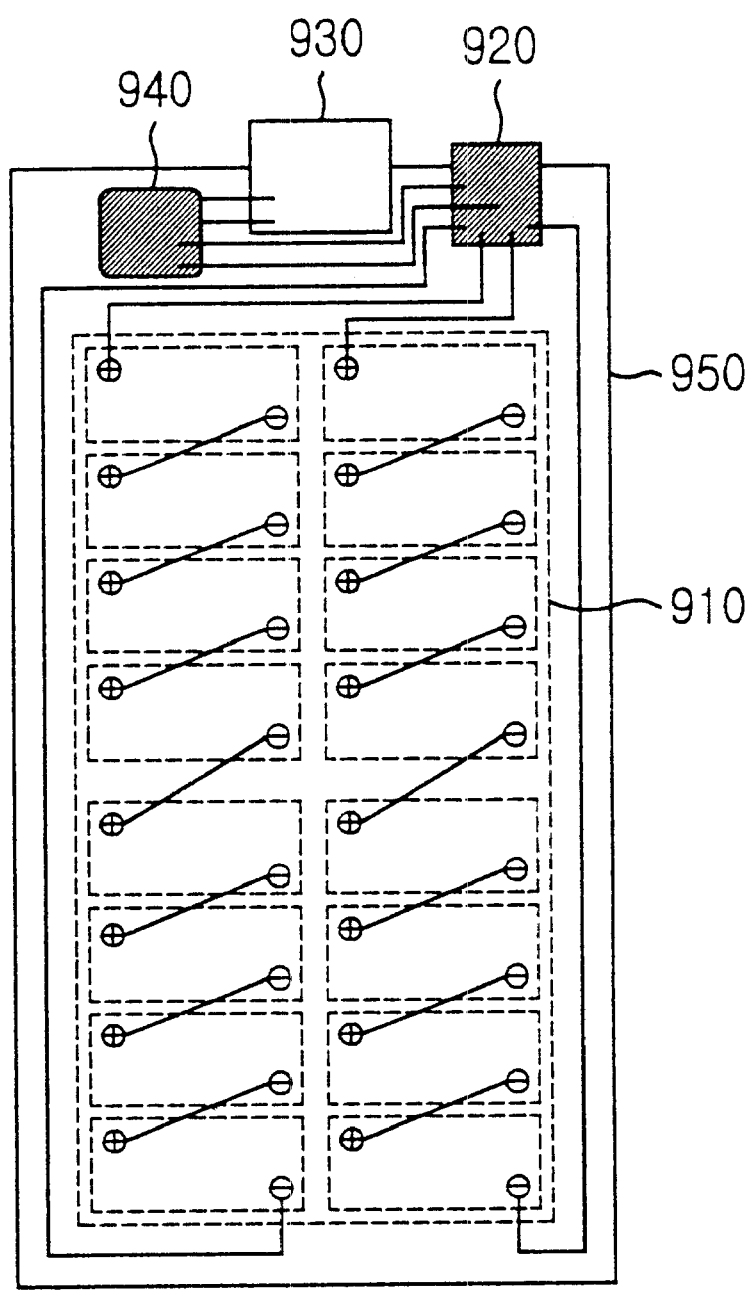
FIG. 9 illustrates a multi-voltage power source device that adopted a shape of a card.

FIG. 9 illustrates a multi-voltage power source device that is adopting a shape of a card. Just as a wallet shape of the device, card-like device also comprises a solar cell plate 910, a power source selection unit 920, a power connecting portion 930 and a portable case 950. An overcharge protection circuit 940 is depicted separately in FIG. 9.

As explained above, the portable multi-voltage power source device of the present invention can be carried out in a light portable case where solar cells are built in separately from a storage battery of an appliance in use, for instance, a mobile phone. Furthermore, as solar cells are molded with flexible transparent heat-resistant polymers, although the solar cell plate goes broken, it does not lead to the damage of the mobile phone. In particular, being able to obtain a various level of power voltage with just simple handling, the multi-voltage power source device can be used for any appliances requiring direct current voltage, such as, mobile phones, mini cassette players, radios, stereos and laptops. In order to downsize the device, wires to mobile apparatuses are kept wound to a semi-automatic reel for convenience. Also, the wire and terminals are embodied separately like volts so that the user can easily adjust and connect various types of terminals according to the apparatus in use.

As described above, the portable multi-voltage power source device of the present invention supplies emergency power to storage batteries of mobile phones, mini cassette players, stereos, radios, and laptops when people are remote from home, having difficulty to access power sources, by charging portable batteries in daytime when the sun lights, or by directly attaching it to appliances you want to use when batteries are discharged. Particularly when attached to an electronic scheduler or something, the multi-voltage power source device can be utilized as a portable power source with extra functions. Also, the multi-voltage power source device of the present invention can be applied for a variety of appliances requiring different power voltages, as it's designed to generate a various level of power voltages.

The spirit of the present invention has been described in the preferred embodiment above, but one thing to remind is that the above embodiment is not for limitation but for just explanation. Also, experts of the field will normally be able to understand that a variety of embodiments are available in the spirit of the present invention.

What is claimed is:

1. A portable multi-voltage power source device for selectively generating various levels of power, comprising:
   at least one solar cell plate that holds a plurality of unit modules, each of the unit modules including a first electrode, a second electrode and a plurality of solar cells which are connected to each other in series;
   a power selection unit that outputs the various levels of power by connecting a first and a second electrode of one unit module to a first and a second electrode of another unit module in parallel, in series and in at least one combination of series and parallel; and a portable case that incorporates the at least one solar cell plate and the power selection unit.

2. The portable multi-voltage power source device of claim 1, wherein the number of unit modules in each solar cell plate is four.

3. The portable multi-voltage power source device of claim 2, wherein the power selection unit includes a cylindrical revolving contact switch and first and second power source terminals which are coupled with the cylindrical revolving contact switch.

4. The portable multi-voltage power source device of claim 3, wherein the various levels of power include:

a first level obtained by connecting the four unit modules in parallel;

a second level obtained by connecting two sets of unit modules in parallel and connecting the unit modules in series in each set;

a third level obtained by connecting the four unit modules in series; and a fourth level obtained by connecting three of the four unit modules in series.

5. The portable multi-voltage power source device of claim 1, wherein each solar cell plate comprises a transparent and heat-resistant polymer.

6. The portable multi-voltage power source device of claim 1, wherein the power selection unit further includes an element that prevents a solar cell output from flowing back to the solar cell.

7. The portable multi-voltage power source device of claim 6, wherein the element is a diode.

8. The portable multi-voltage power source device of claim 1, wherein the power selection unit further includes a protection circuit to prevent the at least one solar cell plate from being overcharged.

9. The portable multi-voltage power source device of claim 1, wherein the portable case is configured so as to be foldable by at least one hinge.

10. The portable multi-voltage power source device of claim 1, wherein the portable case is in the form of a card.

* * * * *